United States Patent [19]

Leonard

[11] 4,295,407
[45] Oct. 20, 1981

[54] KEYBOARD SIMULATION WITH VERTICAL INVERSION INDEXES

[76] Inventor: Verna M. Leonard, 3848 E. Swift, Fresno, Calif. 93726

[21] Appl. No.: 141,577

[22] Filed: Apr. 18, 1980

[51] Int. Cl.$^3$ .............................................. G10G 1/02
[52] U.S. Cl. .................................. 84/471 R; 84/481; 235/89 R
[58] Field of Search .................................. 84/471–473, 84/478–479, 481; 235/85 R, 89 R

[56] References Cited

U.S. PATENT DOCUMENTS

| | | | |
|---|---|---|---|
| 3,350,973 | 11/1967 | Weis et al. | 84/478 |
| 3,431,885 | 3/1969 | Miklas | 235/89 R X |
| 3,903,783 | 9/1975 | Leonard | 84/471 SR |

FOREIGN PATENT DOCUMENTS 2869 of 1884 United Kingdom ............ 84/471 R

Primary Examiner—Lawrence R. Franklin
Attorney, Agent, or Firm—Ralph S. Branscomb

[57] ABSTRACT

A teaching aid simplifies the understanding and practicing of the inversions of the major triads of the diatonic scale by utilizing a series of insert cards which slide into a simulated keyboard and read up vertically duplicate sets of the scale tones of the triad beginning with the underlying keyboard tone. In contrast with the usual method of inversion indication, wherein sequential indicia point out inversions on the keyboard itself, or on a horizontal scale, by reading up vertically rather than horizontally the student is able to easily see the inversion arrangement without confusing it with the keys that he is playing.

6 Claims, 3 Drawing Figures

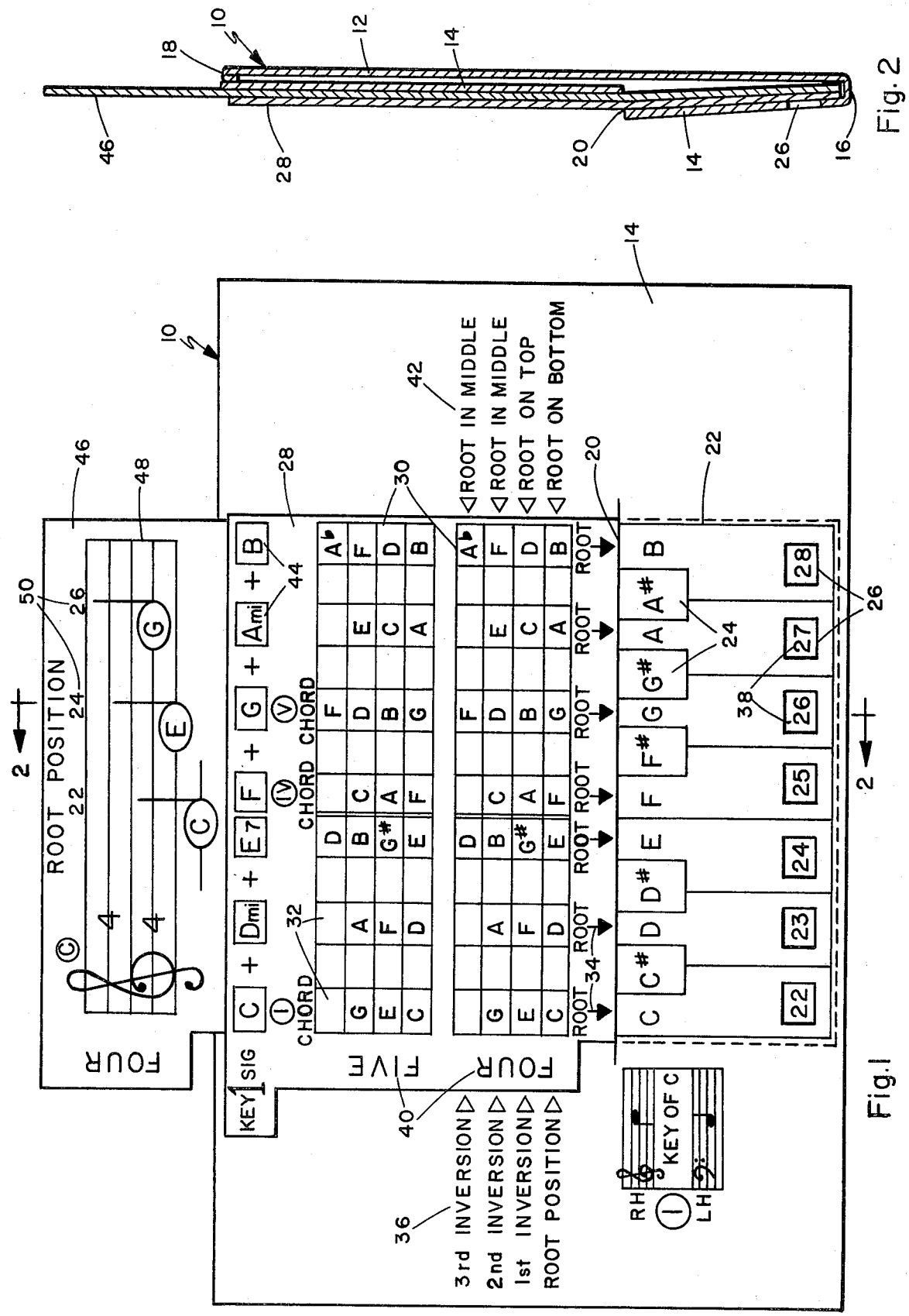

KEYBOARD SIMULATION WITH VERTICAL INVERSION INDEXES

BACKGROUND AND SUMMARY

In music teaching, the learning of inversions is always problematic because students invariably tend to rely too much on the root chord and shy away from inversions. The root position is of no greater dignity than are the inversions, and the root and all the inversions should be used in approximately equal proportion depending on the fingering of a particular piece of music.

Thus, drilling in the inversions is important to becoming an accomplished keyboard instrument player. A number of devices have been developed which point out the inversions from a simulated keyboard or from a scale, but by indexing in this fashion it is difficult to visualize all the inversions at once because the hand position and keys overlap and become confused.

It is thus the purpose of the present invention to provide a teaching aid with vertical displays of the inversions of the chords of major triads. It is also an object of the invention to provide a single, base member having at lease one octave of a simulated keyboard thereon and a plurality of interchangeable insert cards, each of which occupies one octave horizontally and preferably two octaves vertically to show all the inversions for each major triad rooted in each tone of the diatonic scale displayed on the simulated keyboard. The music teaching is carried through into both note reading and consecutive numbering of the diatonic scale tones by virtue of a second card inserted into the base member and revealing diatonic scale tone numbers at the bottom, and displaying above the first card a staff with representative notes from the diatonic scale displayed thereon together with their diatonic scale numbers.

BRIEF DESCRIPTION OF THE DRAWINGS

FIG. 1 is a front elevation view of the principal embodiment of the invention showing the insert card in partial dotted line;

FIG. 2 is a section taken along line 2—2 of FIG. 1;

DETAILED DESCRIPTION OF THE PREFERRED EMBODIMENT

Figure 3:
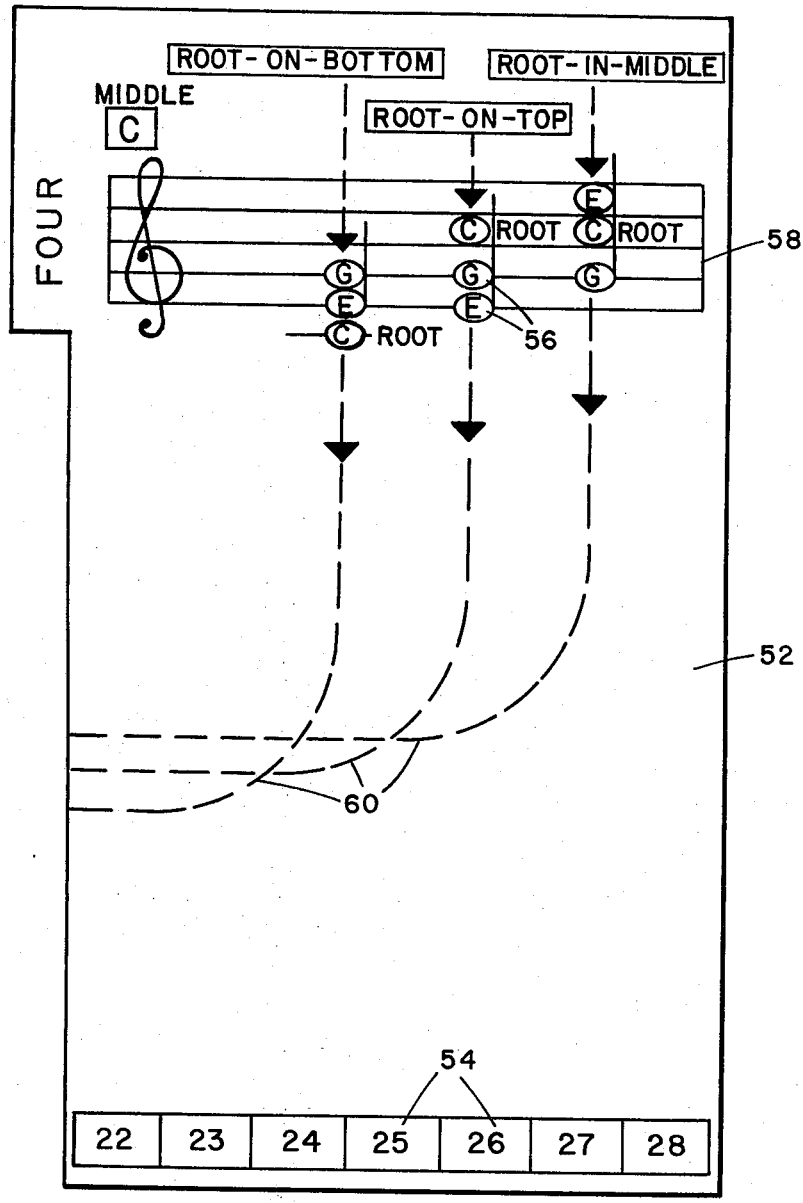
FIG. 3 is a front elevation view of an alternative insert card.

The teaching aid of the instant invention comprises a base member 10 having a back panel 12 and a front panel 14. The front panel in the illustrated embodiment is a continuation of the back panel and is bent up at 16 and glued to the back panel again at the top edge 18. The front panel has a slit 20 about two-thirds of the way down it and beneath this slit is a display 22 of one octave of a keyboard. At the bottom of the keyboard display are a number of windows 26.

An insert card 28 is inserted into the slit as best shown in FIG. 1. This insert card displays a pair of staff-like matrices 30 which house vertical rows 32 of scale tones arranged in the order of major triads using as the root tone the tone from the underlying keyboard key. Indicia 34 indicate the association of the vertical rows with the underlying key.

Further indicia 36 on the front panel 14 registers with the various horizontal rows of scale tones and the bottom matrix to indicate the root tone of the various inversions. The card 28 is octave-specific as indicated by the diatonic scale tone numbers 38 which are visible through the windows 26. The card that is shown pertains to the fourth octave, and therefore the root and inversions of the chords from this octave will be made from scale tones in the fourth or fifth octave as is indicated at 40. The scale tones will of course be the same, and arranged the same, in every octave so that the only change will be the diatonic scale numbers 38 and the octave namers 40. The purpose is of course to emphasize the fact to the students that all the inversions, as well as all the chords, are the same from one octave to the next. It should also be noted that above each of the scale tone rows 32 the chord is named at 44.

Behind the insert card 28 is a note card 46 which has a typical scale or note series on a staff 48, with the diatonic scale tone numbers indicated above at 50. This card could also be utilized with a series of numbers 38 along the bottom, the first card terminating above the windows so that the diatonic scale numbers are associated with the note card.

In FIG. 3 an alternative embodiment of the insert card is shown at 52. This card also has diatonic scale tone numbers at 54 but the vertical tone displays, rather than being in a matrix form as in the first embodiment, are in the form of notes 56 on a staff 58. These various chords are identified as to the inversion they represent by means of connecting lines 60.

In either embodiment, the teaching aid of the instant disclosure is useful to novice and expert alike in aiding one to orient toward the various inversions in any particular diatonic scale. The base member 10 could be selected to represent a different key signature other than C, with a corresponding change in the accompanying cards. The main thrust of the invention is that a single base member is applicable to any octave, and the inversions are read out vertically from a horizontal keyboard.

What is claimed is:

1. A musical teaching aid comprising:
    (a) a base member having a backing panel and a front panel, side panels being seamed together across the top and bottom and said front panel defining a horizontal slit;
    (b) a simulated keyboard displayed on said front panel beneath said slit;
    (c) an insert card for insertion in said slit and having a plurality of vertical rows of tone-naming indicia indexed above the keys in said keyboard;
    (d) the tones in said tone-naming indicia beginning at the bottom tone thereof with the tone of the underlying key and progressing upwardly naming sequential tones in a particular chord; and
    (e) indicia displayed on the front of said front panel naming the inversions of said particular chord and indexing with the tones on said insert card initiating the respective inversion.

2. Structure according to claim 1 wherein each of the vertical rows on said insert card includes sequential tones spanning two octaves, and each of said rows is displayed above one of the keys of said keyboard.

3. Structure according to claim 2 wherein each of the diatonic keys of said keyboard has a window at the bottom thereof, and said insert card has a display visible through said windows numbering said keys according to their position in the diatonic scale.

4. Structure according to claim 1 and including indicia on said front panel indexing with said scale tones to identify the root of each inversion.

5. Structure according to claim 2 and including a note card insertable through said slit and having musical notes corresponding to certain of the notes of said keyboard displayed on a musical staff above said insert card.

6. Structure according to claim 1 wherein said insert card has vertical note clusters on a musical staff displayed thereon representative of different inversions of said chord.

* * * * *